Patented Feb. 20, 1951

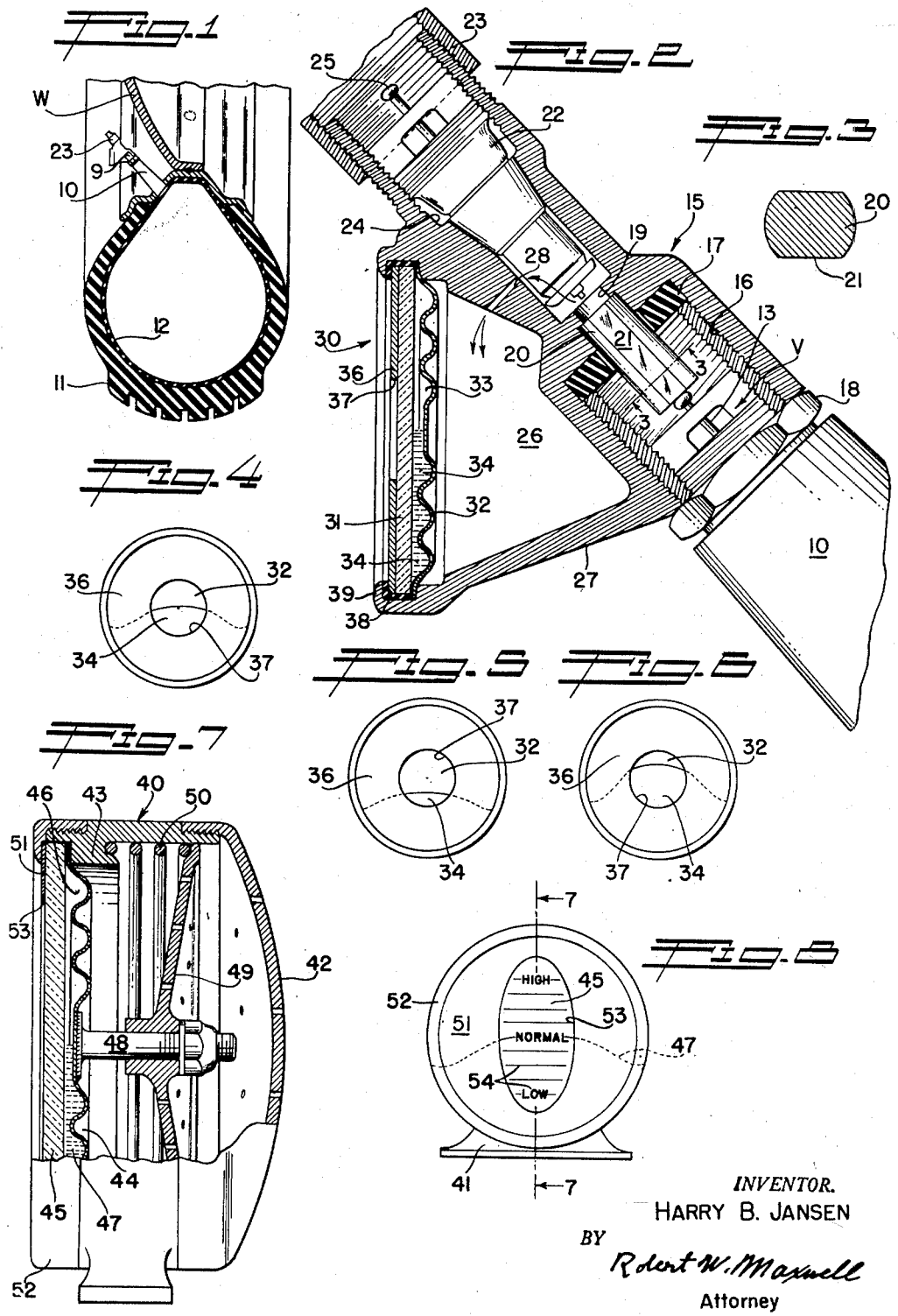

2,542,414

UNITED STATES PATENT OFFICE 2,542,414

PRESSURE INDICATING DEVICE

Harry B. Jansen, Glendale, Calif.

Application March 1, 1946, Serial No. 651,108

15 Claims. (Cl. 73—390)

This invention relates to pressure indicating devices and relates more particularly to instruments for indicating fluid pressures in vessels, pneumatic tires, etc. and to instruments for indicating atmospheric or barometric pressure.

It is a general object of the invention to provide devices of this class which are simple and inexpensive to manufacture, sturdy in construction and dependable in operation.

The invention finds one typical application in devices for indicating the air pressure in the pneumatic tires of automotive vehicles. It has been proposed to install pressure gauges on the valve stems of pneumatic vehicle tires. However, so far as I am aware, the devices of these prior proposals have been of only limited usefulness in that while they are capable of indicating when the tire pressure is below a predetermined value, they are incapable of disclosing excessive pressure and normal pressure conditions. Furthermore, the early devices in this field have been of costly, complicated construction and of considerable weight so as to introduce serious centrifugal force effects when the vehicle wheels are rotated at high speeds.

Another object of the present invention is to provide pressure indicating devices suitable for semi-permanent installation on the valve stems of pneumatic tires and operable to indicate tire pressures within a substantial range, so that it may be determined at a glance whether a particular tire is over inflated, under inflated or correctly inflated. The devices provide clear, easily read indications of the tire pressure conditions and the vehicle operator or service station attendant may immediately determine whether a given tire is properly inflated without the necessity of removing the usual dust cap from the valve stem and then applying the conventional tire gauge. Not only do the devices of the invention disclose under inflation but they also indicate the extent of either excessive or insufficient pressure and disclose when there is the "normal" or preferred pressure in the tire, thus greatly facilitating correct inflation and care of the tires.

Another object of the invention is to provide a pressure gauge of the class referred to that is extremely light in weight so as to impose a minimum of centrifugal force effects even when the vehicle is being operated at high speeds. For example, a typical device of the invention may weigh as little as .39 ounces. When installed on a conventional automobile tire of a vehicle driven at 80 miles per hour, the light weight gauge produces or results in the imposition of only approximately 5.5 pounds centrifugal force on the valve stem.

It is another object of the invention to provide a pressure indicating instrument of the character mentioned that is of rugged construction and having a minimum number of simple, sturdy parts. There are no moving parts subject to wear or maladjustment, and the simple mechanism is not adversely affected by vibration or by rotation of the tire with which it is associated.

It is a further object of the invention to provide a pressure indicating instrument of the class referred to that does not interfere with the introduction of air under pressure into the inner tube of the tire by means of the usual air hose or pump hose. In fact, the device indicates when the proper pressure has been supplied to the tire and thus aids in the tire inflating operation. The valve stem of an inner tube usually projects from the tire and wheel at an angle, and the device of the invention is preferably constructed so that its "face" or indicating means is at all times substantially vertical, irrespective of the angular or rotative position of the wheel, and occupies a position where it does not interfere with the engagement of the hose fitting on the air receiving stem of the device. The gauge or device is such that it may be easily read when the wheel is in any angular or rotative position.

It is a further object of the invention to provide a barometric gauge of extremely simple, rugged construction which requires a minimum number of parts. The barometer of this invention is distinguished from conventional barometers by its extreme simplicity and low cost.

Other objectives and features of the invention will become apparent from the following detailed description of typical embodiments of the invention, throughout which description reference will be had to the accompanying drawings, in which:

Fig. 1 is a fragmentary sectional view of a vehicle wheel and tire assembly illustrating a device of the invention installed on the valve stem;

Fig. 2 is an enlarged vertical detailed sectional view of the device shown in Fig. 1 with certain parts appearing in side elevation;

Fig. 3 is an enlarged transverse sectional view of the valve depressing pin of the device, being a view taken as illustrated by line 3—3 on Fig. 2;

Figs. 4, 5 and 6 are more-or-less schematic front elevations of the face of the device showing the liquid levels in the "normal" pressure, "low"

pressure and "excessive" pressure positions, respectively;

Fig. 7 is a vertical detailed sectional view of a barometer of the invention taken substantially as indicated by line 7—7 on Fig. 8; and Fig. 8 is a reduced front elevation of the barometer.

The principles of my invention are suitable for embodiment in pressure indicating gauges and instruments of various natures. Accordingly, while I have herein described two typical forms of the invention in detail, it is to be understood that the invention is not to be considered as limited to the particular applications and details herein set forth.

In Figs. 1 to 6, inclusive, of the drawings there is shown a pressure indicating device for installation on the stem 10 of a pneumatic tire 11. As shown in Fig. 1, the valve stem 10 projects from the inner tube 12 of the tire to extend through an opening in the rim of an automotive vehicle wheel W. It is typical in installations of this kind to have the stem 10 project from the rim at an angle with respect to the axis of rotation of the wheel W. The outer portion of the stem 10 is externally threaded to receive the conventional dust cap or outer seal cap (not shown) and is internally threaded to cooperate with the usual "valve inside" or valve V. The valve V may be of the standard type found in automobile tires and has an outwardly extending stem or pin 13 adapted to be depressed to open the valve. The head of the pin 13 is inset some distance from the outer end of the stem 10, being adjacent the outer end of the stem when the valve is in the normal closed position. The structure thus far described is typical of automotive wheel and tire assemblies.

The tire gauge of the invention includes a body 15 adapted to be installed on the tire stem 10. In accordance with the invention the body 15 is preferably a one-piece member and may be in the form of a die casting of duraluminum or the like. The inner portion of the body has an axial bore or socket 16 carrying a thread for mating with the external thread of the stem 10. A washer 17 of rubber, or the like, is arranged against the end wall of the socket 16 to seal with the end of the stem 10 when the body 15 is screwed into position. I prefer to provide a jamb nut 18 on the stem 10 to retain the gauge body 15 in the correct rotative position and to deter theft or unauthorized removal of the gauge. Instead of the nut 18, a pronged washer may be arranged on the gauge body 15 to have its prongs forced into the external portion of the stem 10 upon installation of the gauge. An opening 19 of reduced diameter continues outwardly in the body 15 from the socket 16 and a rod member 20 is force fitted or otherwise secured therein. The parts are related and proportioned so that when the body 15 is screw threaded onto the stem 10, to the correct position where a pressure-tight seal is obtained at the washer 17, the member 20 will have depressed the pin 13 of the valve V to hold the valve open. Thus the installation of the pressure gauge on the valve stem 10 automatically opens the valve V and the valve remains open so long as the gauge is in use.

It will be noted that it is unnecessary to remove the standard valve V in order to install the device of the invention. The valve-opening member 20 is externally grooved or provided with external flat faces 21 to permit the passage of air under pressure through the opening 19.

It is preferred to provide the inner or root portion of the body 15 with external flat faces 9 to facilitate engagement of the gauge by a wrench when installing the unit on the valve stem 10.

The outer portion of the body 15 is constructed to contain a valve 22 and to receive a suitable dust cap or outer seal cap 23. An opening 24 extends outwardly through the body 15 from the opening 19 and its outer part carries a thread for cooperating with the thread of the valve 22. The valve 22, like the valve V, may be a typical "valve inside." Such "valve insides" are well known to those skilled in the art and a detailed description of these conventional assemblies is deemed unnecessary. The releasing or opening pin 25 of the valve 22 is readily accessible at the outer end of the body 15 upon removing the cap 23, and the usual air pressure hose or pump hose may be engaged on the body to open the valve 22 for the purpose of supplying air under pressure to the tube 12 of the tire 11.

The gauge body 15 is further provided with a chamber 26 offset from the longitudinal axis of the gauge to be below the parts described above. The chamber 26 is defined by an integral body wall 27 which extends forwardly or outwardly to terminate at a circular mouth. A liquid-containing pressure-indicating vial or pressure responsive diaphragm assembly 30 is arranged in this mouth of the chamber 26 to close the same. A port 28 in the body 15 maintains the chamber 26 in communication with the opening 24. The port 28 joins the opening 24 at a point spaced inwardly from the active sealing washer of the valve 22, so that the chamber is at all times in communication with the interior of the inner tube 12 of the tire. It is preferred to make the port 28 of restricted cross sectional area to prevent the passage of a sudden surge of pressure into the chamber 26 when air pressure is supplied to the tire from a pressure hose. This pressure dampening action protects the diaphragm assembly 30 from injury in the event a sudden surge of air under pressure is delivered to the tire.

The abovementioned pressure responsive indicating asembly 30 includes a transparent window or disk 31 of glass or other selected material and a flexible resilient diaphragm of stainless steel, beryllium copper, or the like. The window disk 31 and diaphragm 32 are preferably in the nature of a preassembled vial unit suitably installed in the mouth of the pressure chamber 26. The marginal or peripheral portions of the disk 31 and diaphragm 32 are permanently secured and sealed together by cement or by being bonded by a high frequency induction heating process. The diaphragm 32 is flanged or stepped rearwardly adjacent its periphery to leave a narrow diaphragm chamber 33 in the order of from $1/32$ to $3/32$ inches thick. It is preferred to form the resilient diaphragm 32 with a series of concentric annular corrugations to resist permanent setting of the diaphragm and to give it the desired action under pressure change. The diaphragm chamber 33 is preferably partially evacuated and is provided with a pressure-indicating body of liquid 34. The liquid 34 preferably has a low freezing point and is such that it will readily wet the surface of the glass or transparent window 31. I have found it practical to employ tinted kerosene as the liquid, it being understood that other suitable liquids may be employed. The forward face of the diaphragm 32 may be stained, tinted, plated or painted a distinctive color or painted with luminescent material and the liquid 34 may be dyed or tinted a contrasting color. For example, the forward face of the diaphragm 32 may be red and the liquid 34 may be tinted black or green.

It will be seen that the yielding resilient diaphragm 32 forms a partition or wall between the pressure chamber 26 and the diaphragm chamber 33. Upon an increase in air pressure within the chamber 26 the diaphragm 32 is flexed toward the window 31, thus reducing the capacity or volume of the diaphragm chamber 33 and the liquid 34 is displaced or spread through a greater area of the chamber. On the other hand, when there is a reduction in pressure in the chamber 26 the diaphragm 32 flexes rearwardly and the volume of the diaphragm chamber 33 increases so that the liquid recedes substantially in proportion to the pressure reduction. Thus the air pressure in the chamber 26 and tire 11 is accurately reflected or indicated by the height of the liquid level in the diaphragm chamber 33.

I have found that the combined surface tension and pressure change effects cause the liquid level to assume an arcuate or curved contour as indicated in Figs. 4, 5 and 6. In order to increase the accuracy and ease of visual pressure readings, I provide an opaque mask plate 36 of metal, or the like, in front of the transparent window 31. The plate 36 has a central opening 37 considerably smaller in diameter than the diaphragm 32. The somewhat limited view opening 37 confines observation of the liquid level and tinted surface of the diaphragm 32 to the central portions where the curve of the liquid level is relatively flat and therefore more truly indicative of the pressure in the tire 11.

The diaphragm assembly or pressure-indicating vial assembly 30 is constructed so that the level of the liquid 34 is substantially midway between the upper and lower extremities of the view opening 37 when a correct or predetermined pressure exists in the tire 11. For example, when there is 32 pounds' pressure in the tire 11, the liquid level will be in a "central" position in the opening 37, as shown in Fig. 4. When the tire pressure has dropped to, say, 30 pounds, the liquid level will be in a "low" position, as shown in Fig. 5; and when the pressure is at, say, 34 pounds, the liquid level is "high," as in Fig. 6. It is to be understood that the pressures just mentioned are typical and that the diaphragm means may be constructed to indicate tire pressure through any selected range.

As mentioned above, the pressure-indicating means 30 is arranged across the mouth of the chamber 26 of the body 15. It is important to secure the assembly or means 30 in the mouth of the chamber 26 in a manner to preserve a pressure-tight closure and seal. In Fig. 2 I have shown a gasket or sealing ring 38 of rubber, rubber composition or the like, engaged around the peripheries of the diaphragm 32, window 31 and plate 36 and lapped over the forward face of the plate. An annular lip 39 of the body 15 is turned or spun back against the washer 38 to securely fix the diaphragm and window assembly in the shouldered mouth of the chamber 26 and to obtain and maintain a pressure-tight seal at the washer 38.

It is important to note that in the installation shown in Figs. 1 and 2 the above-described diaphragm and window means 30 lies in a plane at substantially 45 degrees to the longitudinal axis of the stem 10 where it is approximately normal to the axis of rotation of the wheel W. With this relation of parts the face of the pressure gauge is at all times substantially vertical and is easily read irrespective of the angular position of the wheel W. In other installations the angular position of the gauge face may be considerably different. However, in any case the gauge operates equally well even when tilted at a considerable angle from the vertical.

It is believed that the operation of the pressure gauge illustrated in Figs. 1 to 6 will be readily understood from the foregoing detailed description. The gauge is easily installed on the valve stem 10 without altering the stem in any way and without removing the valve V. The installed gauge does not interfere with or complicate inflation of the tire 11 in the usual way. In fact, the gauge may be consulted during the inflation to determine the pressure within the tire 11. Subsequent to inflation of the tire it is only necessary to view the liquid level at the window opening 37 to ascertain the pressure condition of the tire. The contrasting colors of the diaphragm 32 and tinted liquid 34 make for easy reading of the gauge. As above described, the diaphragm 32 is acted upon by air pressure in the chamber 26 and in turn acts upon the liquid 34 to govern or determine its level in the chamber 33. The level of the liquid as viewed through the opening 37 indicates the pressure within the tire 11 as described above in connection with Figs. 4, 5 and 6. When a liquid of the character described is used in the chamber 33, it will not bubble or foam as a result of wheel rotation, and the gauge is always operative to reveal tire pressure when the wheel is brought to rest, irrespective of its angular position. By observing Fig. 1 it will be seen that the entire pressure gauge is a small compact unit which may have only a slight weight and imposes only minor centrifugal force effects upon the valve stem 10 even when the wheel W is rotated at high speeds. The gauge is inexpensive to manufacture and does not embody any moving parts subject to wear or failure.

Figs. 7 and 8 illustrate the invention embodied in a barometer. This device comprises a tubular horizontally disposed body 40 provided with a suitable supporting base 41. A perforated end plate or cap 42 is threaded or otherwise secured to the rear end of the body 40. In the particular construction illustrated an annular internal flange 43 is formed in the body 40 adjacent its mouth or forward end. The interior of the body 40 forms a pressure chamber, i. e., it contains air at atmospheric pressure by reason of the perforations in the cap 42.

A pressure-indicating vial assembly or diaphragm means is arranged in the mouth of the body 40 and comprises a flexible resilient diaphragm 44 and a transparent window 45. The diaphragm 44 is similar to the diaphragm 32 described above but is considerably larger in diameter and the window 45 is a disk of glass or other transparent material. The diaphragm 44 and window 45 are secured and sealed together adjacent their peripheries by cement or by a bond obtained in an induction heating operation. The active portion of the diaphragm 44 is concentrically corrugated and is spaced a short distance rearwardly from the window 45 to leave a diaphragm chamber 46 of limited axial dimensions. The chamber 46 is evacuated or partially evacuated of air and contains a body of colored liquid 47. The forward face of the diaphragm 44 is preferably painted, stained or plated to have a color different from or contrasting with the color of the tinted liquid.

Spring means is associated with the diaphragm 44 to assist the diaphragm in yieldingly resisting the atmospheric pressure which acts upon its rear surface. A central stem 48 is suitably fixed to the rear face of the diaphragm and extends rearwardly in the body 40. A spider or free plunger 49 is secured to the stem 48 to shiftably operate in the body 40 and is perforated to admit atmospheric pressure to the rear side of the diaphragm. A helical spring 50 is engaged under compression between the rear side of the flange 43 and the forward face of the plunger 49 to urge the diaphragm 44 rearwardly against the action of the atmospheric pressure.

As above mentioned, the diaphragm assembly is arranged in the mouth of the body 40. The flat peripheral or marginal portion of the diaphragm 44 is seated against the forward side of the flange 43 and a mask plate 51 of metal or other opaque material is arranged against the forward side of the window 45. A ring-like cap 52 is threaded or otherwise secured to the forward end of the body 40 and engages rearwardly against the front face of the plate 51 so that the plate, transparent window 45 and diaphragm 44 are securely held between the cap 52 and the flange 43. As in the previously described form of the invention, the combined pressure and surface tension effects cause the level of the liquid 47 to assume a curved or arched contour, as indicated by the broken lines in Fig. 8, and I prefer to make the view opening 53 of the plate 51 somewhat restricted so that only the central portion of the liquid level is visible. The opening 53 is preferably elongated in the vertical direction, as shown, to give the barometer a full range of pressure indication. The face of the plate 51 or of the window 45, or both, are graduated and calibrated to facilitate reading of the pressure. In Fig. 8 I have shown horizontal lines or graduations and pressure legends 54 on the window 45.

It will be apparent that I have provided a simple, inexpensive and dependable barometer. Changes in atmospheric pressure are accurately reflected in variations in the level of the liquid, the diaphragm 44 and spring 50 yielding and flexing in response to such variations to alter the volume of the liquid containing diaphragm chamber 46. There are no moving working parts to wear or get out of adjustment and the device may be fabricated as a small compact instrument.

Having described only typical forms of my invention, I do not wish to be limited to the particular details set forth, but wish to reserve to myself any variations that may fall within the scope of the following claims.

I claim:

1. A pressure-indicating device comprising a chamber in communication with the fluid, the pressure of which is to be indicated, a substantially flat transparent window and a resilient diaphragm arranged in spaced apart generally parallel relation to define a second chamber, the diaphragm being visible through the window, and a body of liquid in the second chamber, the diaphragm being exposed to the fluid pressure in the first-mentioned chamber so that the level of said liquid indicates the degree of said pressure.

2. A pressure-indicating device comprising a chamber in communication with the fluid, the pressure of which is to be indicated, a sealed vial including a substantially flat transparent window and a flexible diaphragm in spaced adjacent generally parallel relation to the window to leave a second chamber, a body of liquid partially occupying the second chamber, and means for supporting said vial where the diaphragm is exposed to the pressure in the first-named chamber so that the level of said liquid body visible through the window indicates the degree of said pressure.

3. A pressure-indicating device comprising a body having a chamber in communication with the fluid, the pressure of which is to be indicated, and a pressure-indicating diaphragm unit carried by the body and including a flexible resilient diaphragm exposed to the fluid pressure in said chamber, a flat generally disk-shaped transparent window in spaced adjacent and substantially parallel relation to the diaphragm to leave a closed second chamber, means sealing and bonding the margins of the diaphragm and window together and a body of liquid in said second chamber, the level of which indicates said pressure, the level of said liquid and the diaphragm being visible through the window.

4. A pressure-indicating instrument comprising a flat disk-shaped transparent window, a diaphragm secured at its margin to the window but spaced at other points from the window to leave a thin chamber and to have a surface visible through the window, means for supporting the window and diaphragm in a position where the diaphragm is exposed to a fluid the pressure of which is to be indicated, and a body of liquid in the chamber of a color different from that of said diaphragm surface, the level of which indicates said pressure.

5. A pressure-indicating instrument comprising a substantially flat transparent window, a diaphragm secured at its margin to the window and arranged in spaced generally parallel relation to the window at other points to define a chamber and to have a surface visible through the window, means for supporting the window and diaphragm in a position where the diaphragm is exposed to a fluid the pressure of which is to be indicated, a body of liquid in said chamber of a color different from that of said surface of the diaphragm, the pressure of said fluid being indicated by the level of said liquid, and means masking from view the marginal portions of said body of liquid.

6. A device for indicating the pressure in a tire having a valve stem comprising a body installed on said stem and having a chamber which communicates with the stem and tire, a substantially flat flexible diaphragm in the body having one side surface exposed to the fluid pressure in said chamber, a generally flat transparent window on the body spaced from the other side surface of the diaphragm, the diaphragm and window defining the walls of a second chamber, and a body of colored liquid in said second chamber, the level of which indicates said pressure, said liquid and said other side surface of the diaphragm being visible through said window.

7. A device for indicating the pressure in a tire having a valve stem comprising a body installed on said stem and having a chamber which communicates with the stem and tire, a substantially flat flexible diaphragm in the body having one side surface exposed to the fluid pressure in said chamber, a generally flat transparent window on the body spaced from the other side surface of the diaphragm so that the spaced diaphragm and window define a second chamber, a body of liquid in said second chamber, the level of which indicates said pressure, said liquid and said other side surface of the diaphragm being visible through said window and being of different colors, and opaque means associated with the window for masking the marginal portions of said liquid and surface.

8. A device for indicating the pressure in a pneumatic tire having a tubular valve stem comprising a body installed on said stem and having a pressure chamber and a restricted port maintaining the chamber in communication with said stem and the interior of the tire, a substantially flat flexible diaphragm having one side surface exposed to the pressure in said chamber, a substantially flat transparent window on the body spaced from the other side surface of the diaphragm so the spaced diaphragm and window define a second chamber, and a body of liquid partially occupying said second chamber, the level of the liquid being visible through the window to indicate the pressure in the tire.

9. A device for indicating the pressure in a pneumatic tire having a tubular valve stem comprising a body installed on said stem and having an opening communicating with the interior of the tubular stem, a pressure chamber and a restricted port maintaining the chamber in communication with said opening, a valve in said opening accessible at the outer end thereof, a flexible diaphragm exposed to the pressure in said chamber, a transparent window spaced from the diaphragm, the diaphragm and window defining a second chamber, and a body of liquid in said second chamber, the level of which indicates the pressure in the tire.

10. A device for indicating the pressure in a pneumatic tire having a tubular valve stem extending therefrom at an angle to the diametric axis of the tire, the device including a body installed on the stem and having an elongate tubular portion continuing from the stem in axial alignment therewith, the body also having a chamber, and a port connecting the chamber with the interior of said tubular portion so as to be in communication with the interior of the tire, a flexible diaphragm exposed to the pressure in the chamber, a transparent window spaced from the diaphragm, the diaphragm and window defining a second chamber, and a body of liquid in said second chamber, the level of which indicates the pressure in the tire, the diaphragm and window lying in planes substantially parallel with the diametrical plane of the tire.

11. A device for indicating the pressure in a pneumatic tire having a tubular valve stem extending therefrom at an angle to the diametric axis of the tire, the device including a body installed on the stem and having an elongate tubular portion continuing from the stem in axial alignment therewith, the body also having a chamber, with a mouth which faces outwardly away from the tire and a port connecting the chamber with the interior of said tubular portion to place the chamber in communication with the interior of the tire, a valve in said tubular portion for preserving pressure in the tire and chamber, and a unit closing the mouth of the chamber comprising a flexible diaphragm exposed to the pressure in the chamber, a transparent window spaced in front of the diaphragm, the diaphragm and window defining a second chamber, and a body of liquid in the second chamber, the level of which indicates said pressure, said unit lying in a plane substantially parallel with the diametral plane of the tire.

12. A barometer comprising a support, and an atmospheric pressure sensitive vial carried by the support including a flexible diaphragm exposed at one side to atmospheric pressure, a transparent window spaced from the other side of the diaphragm, the diaphragm and window defining an evacuated chamber, and a body of liquid in said chamber, the level of which is visible through the window to indicate atmospheric pressure.

13. A barometer comprising a support, and an atmospheric pressure sensitive vial carried by the support including a flexible diaphragm exposed at one side to atmospheric pressure, a transparent window spaced from the other side of the diaphragm, the diaphragm and window defining an evacuated chamber, and a body of liquid in said chamber, the level of which is visible through the window to indicate atmospheric pressure, the liquid and said other side of the diaphragm being of different colors.

14. A barometer comprising a support, and an atmospheric pressure sensitive vial carried by the support including a flexible diaphragm exposed at one side to atmospheric pressure, a transparent window spaced from the other side of the diaphragm, the diaphragm and window defining a partially evacuated chamber, spring means for assisting the diaphragm in yieldingly resisting atmospheric pressure, and a body of liquid in said chamber, the level of which is visible through the window to indicate atmospheric pressure.

15. A barometer comprising a support, and an atmospheric pressure sensitive vial carried by the support including a flexible diaphragm exposed at one side to atmospheric pressure, a transparent window spaced from the other side of the diaphragm, the diaphragm and window defining an evacuated chamber, a body of liquid in said chamber, the level of which is visible through the window to disclose the ambient pressure, and an opaque mask means at the window concealing the marginal portions of the diaphragm and body of liquid.

HARRY B. JANSEN.

REFERENCES CITED

The following references are of record in the file of this patent:

UNITED STATES PATENTS

| Number | Name | Date |
| --- | --- | --- |
| 1,055,827 | Spencer | Mar. 11, 1913 |
| 1,490,036 | Sheppard | Apr. 8, 1924 |
| 1,590,141 | Weaver | June 22, 1926 |
| 1,670,578 | Joyce | May 22, 1928 |

FOREIGN PATENTS

| Number | Country | Date |
| --- | --- | --- |
| 621,426 | Germany | Nov. 7, 1935 |
| 693,309 | France | Aug. 19, 1930 |